United States Patent [19]

Baumgarten

[11] Patent Number: 5,175,907
[45] Date of Patent: Jan. 5, 1993

[54] FASTENING DEVICE FOR SECURING OF A HANDLE ON A COOKING UTENSIL

[75] Inventor: Gerd D. Baumgarten, Wilnsdorf, Fed. Rep. of Germany

[73] Assignee: Heinrich Baumgarten KG Spezialfabrik fuer Beschlagteile, Neunkirchen, Fed. Rep. of Germany

[21] Appl. No.: 703,262

[22] Filed: May 21, 1991

[30] Foreign Application Priority Data

May 22, 1990 [DE] Fed. Rep. of Germany ....... 4016399

[51] Int. Cl.$^5$ ............................................. A47J 45/10
[52] U.S. Cl. ................................ 16/110 A; 16/114 A
[58] Field of Search ......................... 16/110 A, 114 A

[56] References Cited

U.S. PATENT DOCUMENTS

| | | | |
|---|---|---|---|
| 2,979,760 | 4/1961 | Sladky et al. | 16/110 A |
| 4,083,081 | 4/1978 | Witte | 16/114 A |
| 4,127,914 | 12/1978 | Fischbach | 16/110 A |
| 4,179,146 | 12/1979 | Fischbach | 16/110 A |
| 4,387,484 | 6/1983 | Fischbach | 16/110 A |
| 4,575,897 | 3/1986 | Fischbach | 16/110 A |

FOREIGN PATENT DOCUMENTS 3016470 11/1981 Fed. Rep. of Germany ... 16/110 A

*Primary Examiner*—David Jones
*Attorney, Agent, or Firm*—Flynn, Thiel, Boutell & Tanis

[57] ABSTRACT

A fastening device for fastening a handle element on a cooking utensil. In order to assure an easy mounting with a simple manufacturing capability and in order to assure that the handle element even after longer use is fixedly anchored to the cooking utensil, it is provided that at least one support element is fastened to the cooking utensil, which support element has a substantially V-shaped cross section at least in one partial area. At least one cup-shaped fastening element is mounted on the handle element, which fastening element in turn is mounted onto the support element and has on the opposite inside walls a rigid holding bar and a holding spring opposite the holding bar.

15 Claims, 1 Drawing Sheet

U.S. Patent    Jan. 5, 1993    5,175,907
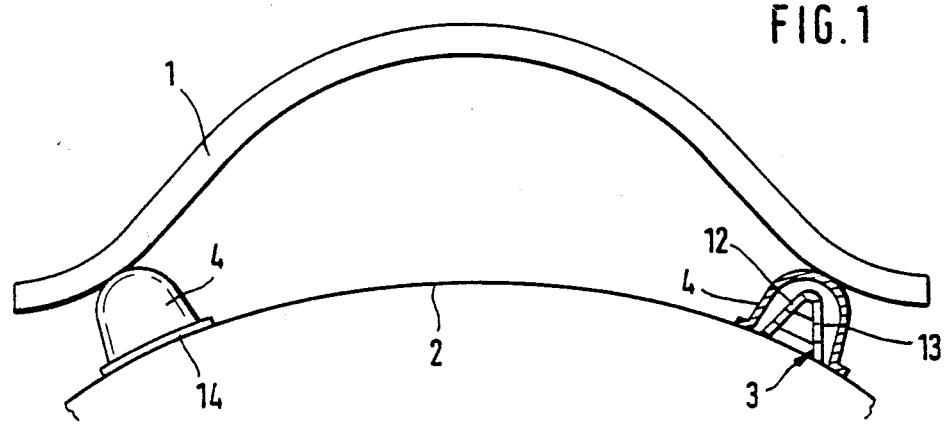
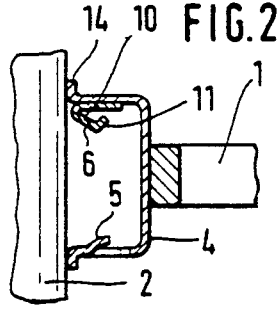
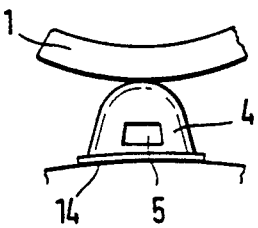
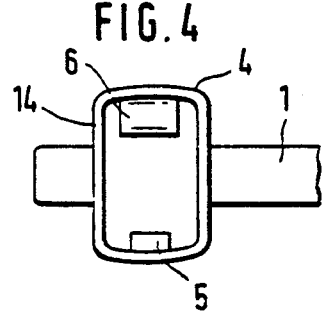
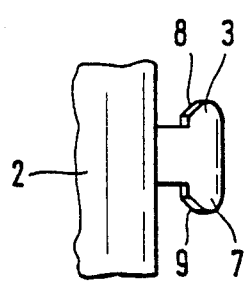
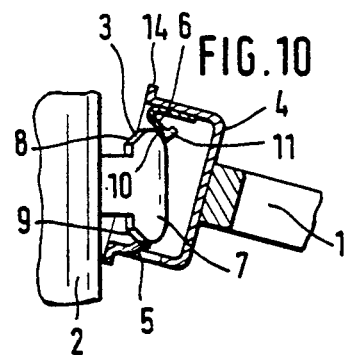
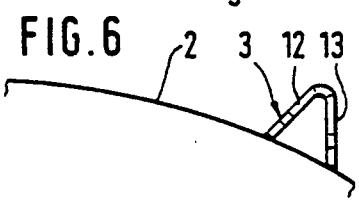
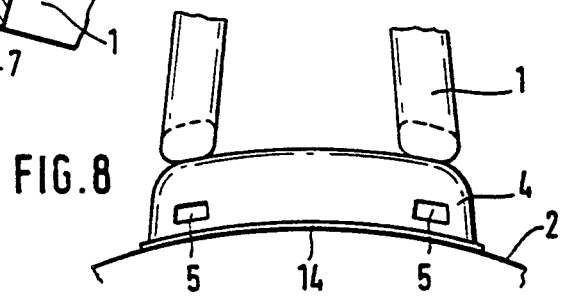
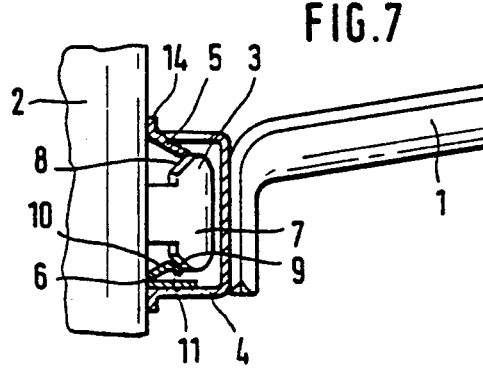
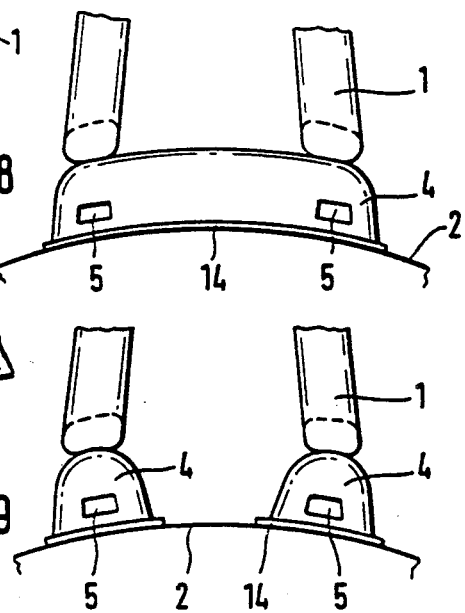

FASTENING DEVICE FOR SECURING OF A HANDLE ON A COOKING UTENSIL

FIELD OF THE INVENTION

The invention relates to a fastening device for fastening a handle element on a cooking utensil.

BACKGROUND OF THE INVENTION

It is necessary when manufacturing cooking utensils to fasten the handle element in such a manner on the cooking utensil, for example a cooking pot, a pan or others, that a reliable transfer of force is assured during a lifting of the utensil. Furthermore, the fastening must be constructed such that same does not loosen during longer operation, in particular under the action of heat. Also the fastening device must tolerate washing or cleaning agents, in particular it must be corrosion-resistant. A further aspect of such fastening devices is that the cooking utensils are often enameled, while the handle elements consist of another material, for example a nonrusting steel or also of plastic. For the last mentioned reasons, it is not possible to connect the handle elements directly to the cooking utensil since the handle element for example cannot be enameled together with the cooking utensil.

A further, important aspect of such fastening devices consist in the heat transfer characteristic between the cooking utensil and the handle element. It is necessary to design the heat transfer characteristic such that the handle element as much as possible does not heat up or only insignificantly heats up when the cooking utensil is in use. A flat connection is for this reason impossible since such a connection would have a very large heat-transfer surface.

Furthermore, it is necessary for fastening devices for handle elements that they can be tightly mounted and without clearance and are designed such that they do not become loose during use.

Fastening devices are known from the state of the art, in which the handle part is moved like a guide rail onto a support element. It is thereby on the one hand disadvantageous that this guide rail, which is fastened on the cooking utensil, projects usually far over the utensil edge and thus interferes during the automatic enamelling process, on the other hand, the guide rail interferes with the manufacturing process and with interdepartmental transport.

The basic purpose of the invention is to provide a fastening element of the above-mentioned type, which with a simple design and simple, inexpensive manufacturing capability enables a reliable, permanent and clearance-free fastening of the handle element.

SUMMARY OF THE INVENTION

The purpose is attained according to the invention by fastening at least one support element on the cooking utensil, which support element has a substantially V-shaped cross section, and by mounting at least one cup shaped fastening element on the handle element, which fastening element can be mounted onto the support element. The support element has on opposing inside walls a rigid holding bar and a holding spring lying opposite the holding bar.

The fastening device of the invention is distinguished by a number of significant advantages. One particular advantage is that the handle element is supported on the one hand by the holding bar rigidly and non-elastically on the support element by the holding bar, while on the other hand the holding spring enables the mounting of the handle element onto the support element and also, due to the elasticity of the holding spring, assures a clearance-free anchoring. Since the holding spring is usually elastic, slight form deviations of the support element, which are for example caused by an enamelling process, can be compensated for.

A further, significant advantage of the fastening device consists furthermore in the fastening element being able to be manufactured, with respect to the material selection, independently from the support element, so that, for example, the fastening element and also the handle element can be manufactured of a nonrusting material, while the cooking utensil together with the support element are enameled.

A particularly favorable design of the invention provides that the support element has an enlarged head area, on the sides of which, which sides face the cooking utensil, clamping surfaces are constructed. The enlarged head area prevents on the one hand a sliding off of the cup-shaped fastening element, the specifically constructed clamping surfaces assure a predeterminable, constant force introduction and facile an exact alignment and adjustment of both the holding spring and the holding bar.

The support element is preferably symmetrically designed so that with respect to the fastening to the cooking utensil no further problems come up since no attention need be paid during the fastening operation regarding a correct left-to-right alignment.

In order to assure as favorable as possible force-transfer conditions, it is provided that the two clamping surfaces are inclined toward the center plane of the support element, the two clamping surfaces form advantageously together an angle of approximately 90° so that the forces introduced by the holding bar and the holding spring act substantially vertically onto the clamping surfaces.

The holding spring has preferably a leg, which in the associated mounted condition is aligned substantially perpendicularly with respect to the respective clamping surface. The elastic holding spring enables also after the mounting of the handle element a clearance-free adjusting and a clearance-free mounting of the fastening element on the support element. It is particularly favorable when a sloped lip exists on the free end of the leg of the holding spring, which lip prevents a jamming while providing a more favorable friction coefficient, and thus assures an automatic adjustment and enables also a demounting.

The fastening device of the invention can be universally utilized and, for example, is suited to support a common handle on a cooking utensil, with the handle or the handle element being mounted by means of two fastening elements. However, it is also possible to secure only one fastening element by means of only one support element on a cooking utensil, for example, to support a pan handle or a shank handle for a casserole. Furthrmore, it is possible according to the invention to associate a separate fastening element with each support element, however, the invention also makes it possible to anchor two support elements with only one fastening element gripping over the two support elements.

It is furthermore particularly advantageous that the fastening element can be designed as a deep-drawn part, thus it is possible to realize also optically very becoming shapes. It is thereby particularly favorable that the outer shape of the fastening element can be freely selected and can be chosen independently from the technical requirements placed on the anchoring with the support element.

The support element is in a particularly favorable manner constructed as a flexible metal part and includes two plates arranged at an angle to one another, which plates are connected at their free ends. The plates have each a substantially T-shaped design with an enlarged head area. This shape of the support element enables on the one hand a particularly simple and inexpensive manufacture, furthermore the support element can be welded in the simplest manner to the cooking utensil prior to same being enameled. The enameling process is not influenced by the support element, since same can be well flushed and since no air bubbles or the like can accumulate in the support element.

The above-described design of the support element as a flexible metal part has the additional advantage that the holding bar can be suspended form lockingly in the fastening element so that an additional assurance is provided against lateral relative movements between the handle element and the cooking utensil.

The cup-shaped fastening element permits many different possibilities of mounting the respective handle element. Same can be welded longitudinally or transversely in relationship to the datum level of the cooking utensil. A further, particular advantage of the invention is that, caused by the symmetrical design of the support element, the cup-shaped fastening element can be suspended in two different positions, one where the holding spring is arranged on top and one where the holding spring is placed at the lower region of the support element. The different force-introduction relationships between the handle element and the cooking utensil can through this be taken into consideration.

BRIEF DESCRIPTION OF THE DRAWINGS

The invention will be described hereinafter in connection with exemplary embodiments and the drawing, in which FIG. 1 is a partially cross-sectioned, schematic top view of a fastening device of a first exemplary embodiment of the invention, which fastening device is mounted ready for operation, FIG. 2 is a cross-sectional side view of an exemplary embodiment of the fastening element, FIG. 3 is a bottom view of a partial area of the fastening element illustrated in FIG. 1, FIG. 4 is a bottom view of the fastening element illustrated in FIGS. 1 to 3, FIG. 5 is a side view of an exemplary embodiment of the support element of the invention, FIG. 6 illustrates a further view of the support element similar to the view illustrated in FIG. 1, FIG. 7 is a side view of a further exemplary embodiment of the fastening device of the invention, FIG. 8 is a top view of a further exemplary embodiment similar to FIG. 1, FIG. 9 is a top view, similar to FIG. 1, of a further exemplary embodiment of the fastening element, and FIG. 10 is a side view illustrating the mounting operation.

DETAILED DESCRIPTION

The figures each show a wire-like handle element 1, which can be manufactured of any desired profile and consists for example of a nonrusting material. The handle element 1 can be designed like a common cooking utensil handle, however, it can also form a shank handle for a pan or casserole as shown in FIG. 7 or it can be designed as a lid handle, which is not shown.

A cooking utensil 2 is indicated only schematically by its outer contours in FIGS. 1 to 10. The cooking utensil 2 can for example be a cooking pot or a pan or lid.

At least one support element 3 is mounted according to the invention on the cooking utensil 2, which support element 3, as can for example be seen in FIGS. 5, 7 and 10, has a substantially T-shaped design with an enlarged head area 7 in the side view. Clamping surfaces 8 and 9 are constructed on the enlarged head area 7 on the side facing the cooking utensil 2, which clamping surfaces define a substantially right angle with respect to one another. FIGS. 1 and 6 show a further side view of the support element 3, from which it can be seen that same consists of two plate-like legs 12 and 13 connected with one another at their vertex area and aligned at an angle with one another to form a v so that a substantially triangular design results when the free ends thereof are connected to a cooking utensil. The legs 12 and 13 are of equal length. The clamping surfaces 8,9 on each leg 12,13 are convergingly inclined with respect to a longitudinal length of a leg and in a direction extending away from the vertex toward one another. Further, vertically spaced and, therefore, corresponding portions of each clamping surface 8, 9 are equidistant from and face away from the vertex.

A substantially cup-shaped fastening element 4 is welded to the handle element, which fastening element 4 has an edge 14 on the bottom side, which edge is exactly fitted to the rounded area of the cooking utensil, as this is for example illustrated in FIGS. 8 and 9. The fastening element 4 is preferably constructed as a deep-drawn part and consists for example also of a nonrusting material. A holding bar 5 and a holding spring 6 are each mounted on opposing sides of the fastening element. The holding bar 5 projects, as can be seen in the illustrations, preferably from the wall and extends as a rigid structural element into the inside of the fastening element 4. The holding spring 6 is fastened as an additional structural part on the inside wall of the fastening element 4, for example by welding. The holding spring 6 has a leg section 10, the free edge of which is formed like a lip 11 in order to facilitate moving of the fastening element 4 over the support element 3 and in order to enable an automatic readjustment of the spring during use or demounting.

Fastening of the handle element 1 on the cooking utensil 2 becomes clear in particular when viewing FIGS. 2, 5 and 10 together. FIG. 2 illustrates a fastening element 4 in a non-mounted state, FIG. 5 shows the support element 3 in the side view. Fastening is accomplished by first placing the holding bar 5 against the clamping surface 9 or rather by suspending the holding bar between the plates 12 and 13. The handle element is subsequently swivelled causing the holding spring 6 to be elastically deformed (compressed) and to be able to slide over the enlarged head area 7 of the support element 3. Both the holding bar 5 and the holding spring 6 are thereafter supported against an active surface location on each of the upper and lower clamping surfaces 8, 9 so that the fastening element 4 is securely anchored on the support element 3. Further, an A-shape connective relationship exists on both the upper and lower edges of the support element 3. FIG. 7 shows such a mounted state, however, with the holding spring 6 being in this case arranged on the underside of the support element 3 in order to be able to compensate for the load conditions occurring especially in the case of a pan.

The invention is not to be limited to the illustrated exemplary embodiments, rather many possibilities for variations and modifications result for the man skilled in the art within the scope of the invention.

The embodiments of the invention in which an exclusive property or privilege is claimed are defined as follows:

1. A fastening device for facilitating fastening of a handle element on a cooking utensil, comprising:
    at least one support element fastened on the cooking utensil, said support element including an elongated plate-like member bent at a mid-region thereof into a V-shape to form a pair of legs diverging away from a vertex of the V, a free end of each leg being fastened directly to said cooking utensil, oppositely facing edge surfaces of each leg of the V including a pair of oppositely facing clamping surfaces, said clamping surfaces on each leg being convergingly inclined with respect to a longitudinal length of a said leg, and in a direction extending away from said vertex, toward one another, and
    at least one cup-shaped fastening element mounted on the handle element, said fastening element having first and second opposing inside walls, on said first inside wall is provided a rigid holding bar and on said second inside wall is provided a compressible holding spring opposing said holding bar, said holding bar and said holding spring engaging respective ones of said clamping surfaces at active surface locations thereon, a spacing between said active surface locations on opposite sides of each said leg being greater than a spacing between said holding bar and an uncompressed state of said holding spring so that, upon engagement of said holding bar and said holding spring with said clamping surfaces, said holding spring will be compressed to operatively fixedly hold said fastening element and associated handle to said cooking utensil.

2. The device according to claim 1, wherein the support element has an enlarged head area at the vertex, said clamping surfaces being defined by edge surfaces of said enlarged head which face toward the cooking utensil.

3. The device according to claim 2, wherein the holding bar, in the connected state of the fastening element with the support element, is engaged with a clamping surface on each leg to from an A-shaped connective structure.

4. The device according to claim 2, wherein the holding spring has a leg section which, in the connected state of the fastening element with the support element, is engaged with a clamping surface on each leg to form an A-shaped connective structure.

5. The device according to claim 4, wherein a free end of the leg section forms a sloped lip.

6. The device according to claim 1, wherein the legs of said support element are of equal length from the vertex.

7. The device according to claim 6, wherein the two clamping surfaces together define an angle of approximately 90°.

8. The device according to claim 1, wherein the handle element is fastened by means of two support elements.

9. The device according to claim 8, wherein two fastening elements are arranged on the handle element.

10. The device according to claim 8, wherein a fastening element gripping over both support elements is arranged on the handle element.

11. The device according to claim 1, wherein the fastening element is constructed as a deep-drawn part.

12. The device according to claim 1, wherein the support element is designed as a flexible metal part, the two legs thereof arranged at an angle to one another, each said leg having a substantially a T-shaped design and is connected to the other leg at a cross part of the T.

13. The device according to claim 12, wherein the holding bar is integrally formed from the material of the fastening element.

14. The device according to claim 1, wherein said legs of said support member are of equal length.

15. The device according to claim 1, wherein corresponding portions of each said clamping surface are equidistant from and facing away from the vertex.

* * * * *